(12) United States Patent
Cockerton

(10) Patent No.: US 7,619,645 B2
(45) Date of Patent: Nov. 17, 2009

(54) AUDIO VISUAL MEDIA ENCODING SYSTEM

(75) Inventor: Craig George Cockerton, Hamilton (NZ)

(73) Assignee: Tandberg NZ Limited, Hamilton (NZ)

( * ) Notice: Subject to any disclaimer, the term of this patent is extended or adjusted under 35 U.S.C. 154(b) by 998 days.

(21) Appl. No.: 10/500,158

(22) PCT Filed: Aug. 21, 2003

(86) PCT No.: PCT/NZ03/00187

§ 371 (c)(1),
(2), (4) Date: Jan. 27, 2005

(87) PCT Pub. No.: WO2004/019591

PCT Pub. Date: Mar. 4, 2004

(65) Prior Publication Data

US 2005/0122393 A1 Jun. 9, 2005

(30) Foreign Application Priority Data

Aug. 23, 2002 (NZ) .................................. 520986

(51) Int. Cl.
*H04N 7/14* (2006.01)
*H04L 12/16* (2006.01)
(52) U.S. Cl. ............... 348/14.13; 348/14.12; 348/14.08
(58) Field of Classification Search ... 348/14.01–14.16; 370/260, 261, 410, 465; 709/204
See application file for complete search history.

(56) References Cited

U.S. PATENT DOCUMENTS

| 5,132,992 | A | | 7/1992 | Yurt et al. |
|---|---|---|---|---|
| 5,253,275 | A | | 10/1993 | Yurt et al. |
| 5,550,863 | A | | 8/1996 | Yurt et al. |
| 5,764,277 | A | | 6/1998 | Loui et al. |
| 5,764,901 | A | | 6/1998 | Skarbo et al. |
| 5,999,966 | A | * | 12/1999 | McDougall et al. ......... 709/204 |
| 6,002,720 | A | | 12/1999 | Yurt et al. |
| 6,144,702 | A | | 11/2000 | Yurt et al. |
| 6,181,784 | B1 | | 1/2001 | Duran et al. |

(Continued)

FOREIGN PATENT DOCUMENTS

CN 1421099 T 5/2003

(Continued)

OTHER PUBLICATIONS

Richard Winefield, Internal Document: CUseeMe Networks Streaming Media Overview, Mar. 15, 2001 25 pages.

(Continued)

*Primary Examiner*—Melur Ramakrishnaiah
(74) *Attorney, Agent, or Firm*—Oblon, Spivak, McClelland, Maier & Neustadt, L.L.P.

(57) ABSTRACT

The present invention relates to a method, system and apparatus for encoding audio visual media signals sourced from preferably a video conference transmission. The technology provided is adapted to receive a video conference transmission from a computer network where this video conference transmission includes at least one audio visual signal and at least one protocol signal. One or more protocol signals are then read from the transmission received with the technology provided applying a selected encoding process to a received audio visual signal, wherein the encoding process selected depends on the contents of a read protocol signal.

37 Claims, 17 Drawing Sheets

U.S. PATENT DOCUMENTS

| | | |
|---|---|---|
| 6,285,746 B1 | 9/2001 | Duran et al. |
| 6,466,248 B1 | 10/2002 | Spann et al. |
| 6,597,702 B1 * | 7/2003 | Caugherty .................. 370/410 |
| 6,741,250 B1 * | 5/2004 | Furlan et al. ................. 345/427 |
| 7,043,528 B2 | 5/2006 | Schmitt et al. |
| 2001/0047517 A1 | 11/2001 | Christopoulos et al. |
| 2002/0126201 A1 | 9/2002 | Schmitt et al. |
| 2004/0003040 A1 * | 1/2004 | Beavers et al. .............. 709/204 |

FOREIGN PATENT DOCUMENTS

| | | |
|---|---|---|
| EP | 1 069 779 A1 | 1/2001 |
| EP | 1 069 788 A2 | 1/2001 |
| EP | 1290881 | 3/2003 |
| JP | 2003530787 | 10/2003 |
| WO | 92/12599 A1 | 7/1992 |
| WO | WO 99/23560 | 5/1999 |
| WO | 01/78393 A1 | 10/2001 |

OTHER PUBLICATIONS

User Guide, Version 5.0, CUseeMe Conference Server, Chapter 1-7, pp. 1-2 thru 7-48.

CUseeMe Videoware, Rich Media Communications, First Virtual Communications, 1 page.

Streaming Media, Product Overview, First Virtual Communications, Enables Interactive Conferences to be Streamed Live or Recorded, www.fvc.com, 2 pages.

First Virtual Corporation, The Leader in Business Quality Video Networking, 17 pages.

Internet Telephony Product Reviews, MeetingPoint Conference Server, Version 4.0, Nov. 1999, pp. 1-7.

CUseeMe Conference Server, Telenet Interface Guide, Version 5.0, pp. 1-3 thru 2-246.

* cited by examiner

VideoFastPictureUpdate

Frames

Table 1

```
cifMacroblocks = 396
qcifMacroblocks = 99
macroblock threshold = 0.85
max time between keyframes = 10sec for (every received frame)

get next frame
        get frame type
        get (macroblock count) for frame if frame type == CIF
                if (macroblock count) == cifMacroblocks then frame is INTRA-coded
                (macroblock threshold count) = cifMacroblocks * macroblock
threshold
        else if frame type == QCIF
                if (macroblock count) == qcifMacroblocks then frame is INTRA-coded
                (macroblock threshold count) = qcifMacroblocks * macroblock
threshold
        end if if frame is INTRA-coded
                if (Check Force Keyframe)
                        force encode keyframe
                else
                        standard encode frame
                end if else if INTRA-coded frame expected
                if (time since last keyframe) >= (max time between keyframes)
                        increase (max time between keyframes)
                else
                        standard encode frame else if INTRA-coded MB threshold
                if (macroblock count) >= (macroblock threshold count)
                        if (Check Force Keyframe)
                                force encode keyframe
                        else
                                standard encode frame
                        end if
                else
                        standard encode frame end if end for Check Force Keyframe
BEGIN get (time since last keyframe)
        get (keyframe threshold)
        keyframeCheck = (max time between keyframes) * (keyframe threshold)
        if (time since last keyframe) >= keyframeCheck
                return true
        else
                return false
        end if
END
```

Table 2

```
cifMacroblocks = 396
qcifMacroblocks = 99
macroblock threshold = 0.85
max time between keyframes = 10sec for (every received frame)

get next frame
       get frame type
       get INTRA-coded (macroblock count) for frame if frame type == CIF
               if (macroblock count) == cifMacroblocks then frame is INTRA-coded
               (macroblock threshold count) = cifMacroblocks * macroblock
threshold
       else if frame type == QCIF
               if (macroblock count) == qcifMacroblocks then frame is INTRA-coded
               (macroblock threshold count) = qcifMacroblocks * macroblock
threshold
       end if if frame is INTRA-coded
               if (Force Keyframe Threshold)
                       go to Forced Keyframe Index
               else
                       go to Standard Encode Index
               end if
       else
               if INTRA-coded frame expected
                       if (time since last keyframe) >= (max time between
keyframes)
                               increase (max time between keyframes) by
                                       (max time to live)
                               store index data go to Standard Keyframe Index
                       end if
               else
                       if INTRA-coded MB threshold
                               if (Force Keyframe Threshold)
                                       go to Forced Keyframe Index
                               else
                                       go to Standard Keyframe Index
                               end if
                       else
                               go to Standard Keyframe Index
                       end if
               end if
       end if
end for
```

Table 2 continued

*Forced Keyframe Index*

BEGIN if (*Get Index Status*)
              encode index mark
       end if force encode keyframe
       return

END

*Standard Encode Index*

BEGIN if (*Get Index Status*)
              encode index mark if (*Index Keyframe Threshold*)
                     force encode keyframe
              else
                     standard encode keyframe
              end if else
              standard encode keyframe
       end if

END

*Index Keyframe Threshold*

BEGIN get (time since last keyframe)
       get (keyframe index threshold)
       keyframeCheck = (max time between keyframes) * (keyframe index threshold)
       if (time since last keyframe) >= keyframeCheck
              return true
       else
              return false
       end if

END

*Force Keyframe Threshold*

BEGIN get (time since last keyframe)
       get (keyframe threshold)
       keyframeCheck = (max time between keyframes) * (keyframe threshold)
       if (time since last keyframe) >= keyframeCheck
              return true
       else
              return false
       end if
END

Table 3

Get Index Status

BEGIN

```
    get stored index
    get current index if (stored index) and (current index)

if (stored index type) != (current index type)
                    return (stored index) and (current index)
            else
                    return (current index)
            end if else if (current index)
            return (current index)

else if (stored index)

if frame is INTRA-coded
                    return (stored index)
            else if (stored index) exceeded time to live
                    return (stored index)
            else
                    return (no index)
            end if else
            return (no index)
    end if

END
```

Table 4

*Jitter Buffer Adjust*

```
BEGIN
        if (video freeze picture) in force get currentBufferSize
                if startBufferSize not set
                        set startBufferSize to currentBufferSize
                end if if currentBufferSize > (minBufferSize * bufferAdjustRatio)

calculate gap between current and next talkspurts if (gap > minimumGap)
                                adjustGap = (gap - minimumGap) * adjustLevel if adjustGap > maxAdjustGap
                                        adjustGap = maxAdjustGap
                                end if tell jitterBuffer adjustGap
                                // adjusting the gap between talkspurts to playout
                                // the packets earlier will cause the buffer to
                                // drain quicker.
                        end if end if else if (freeze picture release)
        // actual freeze picture release could be received in multiple video
        // packets but we only want to do this stuff once so this needs to be
        // controlled by calling function set bufferMadeUpSoFar to 0
                set bufferRecovery true
                get currentBufferSize
                set endBufferSize to currentBufferSize set bufferToMakeUp = startBufferSize - endBufferSize
                // we need to makeup the buffer size that we drained by
                // playing out packets quicker than normal if (currentBufferSize < maxBufferSize)

adjustGap = increaseGap * (1+(1-adjustLevel))

if (adjustGap + bufferMadeUpSoFar) > bufferToMakeUp adjustGap = bufferToMakeUp - bufferMadeUpSoFar
                                bufferRecovery = false end if increase bufferMadeUpSoFar by adjustGap
                        tell jitterBuffer adjustGap
```

Table 4 continued

```
            else
                    bufferRecovery = false
            end if else if (bufferRecovery)
            // we've done the freeze picture release to start the recovery now it's
            // time to complete it by increasing the talkspurt gaps until we recover
            // from the draining of the buffer during the video freeze picture.
                if (currentBufferSize < maxBufferSize)
                        adjustGap = increaseGap * (1+(1-adjustLevel))

if (adjustGap + bufferMadeUpSoFar) > bufferToMakeUp adjustGap = bufferToMakeUp - bufferMadeUpSoFar
                                bufferRecovery = false end if increase bufferMadeUpSoFar by adjustGap
                        tell jitterBuffer adjustGap else bufferRecovery = false end if end if

END
```

AUDIO VISUAL MEDIA ENCODING SYSTEM

RELATED APPLICATIONS

The present application corresponds to International Application No. PCT/NZ2003/000187 filed Aug. 21, 2003, which is based on, and claims priority from, New Zealand Application Serial No. 520986, filed Aug. 23, 2002, the disclosure of which is hereby incorporated by reference herein in its entirety.

TECHNICAL FIELD

This invention relates to an Audio visual Media Encoding System. Preferably, the present invention may be adapted to encode videoconferences, seminars or presentations made over a computer network for review by an observer, either in real time or at a later time. Reference throughout this specification will also be made to the present invention being used in this situation, but those skilled in the art should appreciate that other applications are also envisioned and reference to the above only throughout this specification should in no way be seen as limiting.

BACKGROUND ART

Video conferencing systems have been developed which allow two-way audio and video communications between participants at remote locations. Participants may, through a common digital transmission network, participate in a real time videoconference with the assistance of cameras, microphones and appropriate hardware and software connected to the computer network used. Videoconferences can be used to present seminars or other types of presentations where additional media such as slides or documents may also be supplied to a further input system or document camera for integration into the video or data stream sent.

As the participants of videoconferences interact in real time with one another, this places a high demand on network bandwidth with the transmission of audio visual content signals. Furthermore, there can be some quality problems with the audio visual content of the conference if the network employed does not have sufficient bandwidth required to run the conference correctly. In such instances the internet protocol packets which make up the stream of signals between participants can be lost or late arriving to a receiver and hence cannot be integrated effectively in real time into the video and audio played out.

In some instances it is also preferable to supply or stream these video conferencing signals to additional observers who cannot necessarily participate in the conference. These observers may, for example, be interested in a seminar or presentation made but may not necessarily need to, or be able to, attend or participate in the conference in real time. Additional observers may view a stream of audio visual signals in real time as the conference occurs, or alternatively can view this information at a later time as their participation within the conference is not required. This stream may also be made available to conference participants at a later time.

To stream videoconference content to additional observers the signals generated are normally supplied to an additional encoding computer system. Using current technology such a computer is supplied with an analogue feed of the video and audio signals sourced from videoconference unit cameras and microphones, which subsequently converts, encodes or formats this information into a digital computer system file which can be played by specific software player applications. The actual encoding or formatting applied will depend on the player application which is to subsequently play or display the encoded videoconference. As can be appreciated by those skilled in the art, this encoded information may be streamed or transmitted out to observers in real time, or alternatively may be stored for later transmission to observers.

However, this approach used to encode videoconference content for additional observers suffers from a number of problems.

In the first instance there are losses in accuracy or quality in the resulting formatted output due to the conversion of digital audio and video information to an analogue format for subsequent supply to the encoding computer system. In turn the computer system employed converts these analogue signals back into digital format, resulting in quality and accuracy losses with each conversion made.

Furthermore, the encoding computer used must be provided with an analogue cable connection to the video conferencing equipment and thereby in most instances must also be located within a room in which one end point of the videoconference is to take place. This requires a further piece of apparatus to be located within the video conferencing room or suite, which must also be set up and configured prior to the conference in addition to the video conferencing equipment itself.

One attempt to address these issues has been made through use of video conferencing transmission protocol, being ITU H.323 entitled "Packet-Based Multi-Media Communication System". This protocol allows audio visual signals and associated protocol information to be transmitted to a network address from the video conferencing equipment employed—without this network address acting as a full participant to the videoconference call taking place. The additional connection can be described as a streaming end point for the videoconference signals which can be supplied to the digital audio and visual information required, without the necessary digital to analogue to digital conversions required using existing technology.

However, a major complication with the use of this basic protocol arises from the high bandwidth requirements employed in the video conferencing call, and a subsequent streaming of signals to the end point at high bit rates. When re-transmitted to software player applications, the higher bit rate of the supplied input will be present in the output produced, thereby resulting in a large video file or high bandwidth requirements, which cannot readily be accessed by low speed connections to the computer network employed.

An improved audio visual media encoding system which addressed any or all of the above problems would be of advantage. A system would could act as an end point for conference calls and could encode or format audio and videoconference content for subsequent streaming or supply to observers across multiple bitrates would be of advantage. A system which could exhibit and provide flexibility and functionality regarding how these video and audio signals are encoded and supplied to observers would be of advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of encoding audio visual media signals, characterised by the steps of;
  (i) receiving a videoconference transmission from a computer network, said videoconference transmission including at least one audio visual signal and at least one protocol signal, and
  (ii) reading one or more protocol signals, and
  (iii) applying a selected encoding process to a received audio visual signal, said encoding process being selected depending on the contents of said at least one protocol signal read.

According to a further aspect of the present invention there is provided a method of encoding audio visual media signals further characterised by the additional subsequent step of
  (iv) producing encoded output for a software player application.

According to yet another aspect of the present invention there is provided a method of encoding audio visual media signals substantially as described above, wherein the contents of said at least one read protocol signal is used to detect the time position of at least one keyframe present within an audio visual signal of the videoconference transmission.

According to a further aspect of the present invention there is provided a method of encoding audio visual media signals substantially as described above, wherein the contents of said at least one read protocol signal indicates a content switch present within an audio visual signal of the videoconference transmission.

According to a further aspect of the present invention there is provided a method of encoding audio visual media signals substantially as described above, wherein the encoding process selected associates at least one index marker with the encoded output when a content switch is detected using said at least one read protocol signal.

According to another aspect of the present invention there is provided a method of encoding substantially as described above wherein index markers are associated with the encoded output at the same time position at which a content switch is detected within an audio visual signal of the videoconference transmission.

According to a further aspect of the present invention there is provided a method of encoding audio visual media signals substantially as described above, wherein a read protocol signal provides information regarding any combination of the following parameters associated with an audio visual signal of the videoconference transmission;
  (i) audio codec employed and/or
  (ii) video codec employed and/or
  (iii) the bit rate of audio information supplied and/or
  (iv) the bit rate of video information supplied and/or
  (v) the video information frame rate and/or
  (vi) the video information resolution.

The present invention is preferably adapted to provide a system and method for encoding audio visual media signals. Preferably these signals may be sourced or supplied from a videoconference transmission, with the present invention being adapted to encode at least a portion of these signals into a format which can be played to other users or observers who are not directly participating in the videoconference. Reference throughout this specification will also be made to video conferences being transmitted using computer networks which should of course be considered by those skilled in the art to encompass any form of digital transmission network infrastructure or system.

Preferably the present invention may be used to implement an encoding process to be run in a computer system which can execute the method or methods of encoding as described herein. Furthermore, the present invention may also encompass apparatus used to perform such methods of encoding, preferably being formed from a computer system loaded with computer software adapted to execute or implement the present invention. The present invention may be adapted to produce an encoded output which can be played, displayed or otherwise relayed to further users without these new users necessarily needing to participate in the videoconference involved nor needing to view the encoded output at the same time at which the videoconference takes place.

Preferably apparatus used in conjunction with the present invention to provide the encoding process required may be used to take part directly in the videoconference involved, and in some instances, can be considered as a videoconference end point. The apparatus or equipment used to provide such an end point may in turn transcode or re-encode at least one audio visual signal received in conjunction with the videoconference to provide a transcoded audio visual output in conjunction with the present invention. The encoded output produced may be stored to a computer file, or alternatively may be transmitted or streamed to other users once encoded if required.

Preferably, the present invention may be adapted to provide an encoded output file, signal or transmission, which can be received or played by a computer based software player application to display audio visual media or content. The encoded output provided using the present invention may, in some instances be streamed or transmitted to non-participating observers of a videoconference in real time as the videoconference occurs. Alternatively, in other instances, the encoded output provided may be saved to a computer file or files which in turn can be downloaded or transmitted to non-participating observers to be played at a later time.

For example, in some instances the present invention may be adapted to provide an encoded audio visual content output which can be played with Microsoft's Windows Media Player™, Apple's Quicktime Player™ or Real Network's RealPlayer™. Furthermore, the players involved may also support the reception of real time streaming of the encoded output to observers as the videoconference involved occurs.

Reference throughout this specification will also be made to the present invention provided encoded output to be played on or by a computer using a computer based software player applications. However, those skilled in the art should appreciate that references to computers throughout this specification should be given the broadest possible interpretation to include any form or programmed or programmable logic device. Stand alone personal computers, personal digital assistants, cellphones, gaming consoles and the like may all be encompassed within such a definition of a computer and in turn may all be provided with software adapted to play the encoded output provided in accordance with the present invention. Those skilled in the art should appreciate that reference to computers and computer software applications should not in isolation be considered to references to personal computers only.

In a further preferred embodiment the encoded output provided may be adapted to be transmitted or distributed over a digital transmission network. This formatting of the encoded output provided allows same to be distributed easily and quickly to a wide range and number of geographically disbursed users if required. Reference throughout this specification will also be made to transmissions of encoded output being made over computer networks. However, those skilled in the art should appreciate that any type of transmission network, system or infrastructure which allowed for the transmission of digital signals or digital content may be employed in conjunction with the present invention if required.

Reference throughout this specification will also be made to the encoded output provided being adapted to provide an input for a software based player application for a computer system. However, those skilled in the art should appreciate that other formats or forms of encoded output may also be produced in conjunction with the present invention and reference to the above only throughout this specification should in no way be seen as limiting. For example, in other embodiments the present invention may provide an encoded output which can be played using a cellular phone, PDA's, game consoles or other similar types of equipment.

Preferably, the videoconference transmissions made may be transmitted through use of a computer network. Computer networks are well-known in the art and can take advantage of existing transmission protocols such as TCP/IP to deliver packets of information to participants in the videoconference.

In a preferred embodiment, the videoconference transmissions received in conjunction with the present invention may be supplied through a computer network as discussed above. Receiving and encoding hardware employed in conjunction with the present invention may be connected to such a computer network and assigned a particular network or IP address to which these videoconference transmissions may be delivered.

Those skilled in the art should appreciate that reference to computer networks throughout this specification may encompass both networks provided through dedicated ethernet cabling, wireless radio networks, and also distributed networks which employ telecommunications systems.

In a further preferred embodiment, hardware or apparatus employed by the present invention may be described as a streaming or streamed end point for the videoconference call involved. A streaming end point may act as a participant to the videoconference without necessarily supplying any usable content to the videoconference call. This end point of a particular address in the computer network may therefore receive all the transmissions associated with a particular videoconference without necessarily contributing usable content to the conference. Those skilled in the art should appreciate that end points as referred to throughout the specification may encompass any apparatus or components used to achieve same, which have also previously been referred to as 'terminals', 'gateways' or 'multi-point control units', for example.

The present invention preferably provides both a method and apparatus or system for encoding audio visual media. The system or apparatus employed may be formed from or constitute a computer system loaded with (and adapted to execute) appropriate encoding software. Such software through execution on the computer system through the computer system's connections to a computer network) can implement the method of encoding discussed with respect to the present invention. Furthermore, this computer system may also be adapted to store computer files generated as an encoded output of the method described, or retransmit the encoded output provided to further observers in real time.

Reference throughout this specification will also be made to the present invention employing or encompassing an encoding computer system connected to a computer network which is adapted to receive videoconference transmissions and to encode same using appropriate software.

For example, in one instance the present invention may take advantage of the H323 protocol for videoconference transmissions made over a computer network. This protocol may be used to supply digital signals directly to an encoding computer system without any digital to analogue to digital conversions of signals required.

Reference throughout this specification will also be made to the present invention being used to encode audio visual media sourced from a videoconference transmission made over a computer network. However, those skilled in the art should appreciate that other applications are envisioned for the present invention and reference to the above only throughout this specification should in no way be seen as limiting. For example, the present invention may be used to encode other forms of streamed or real time audio visual transmissions which need not necessarily be videoconference based, nor directly related to transmissions over computer networks.

Preferably, the videoconference transmissions received by the encoding computer may be composed of or include at least one audio visual signal or signals and at least one protocol signal or signals.

Preferably, an audio visual signal may carry information relating to audio and/or video content of a videoconference as it occurs in real time. A single signal may be provided which carries both the audio and visual content of the conference as it is played out over time in some instances. However, in alternative situations a separate signal may be provided for both the audio and the video components of such conferences required.

Preferably, the videoconference transmissions received also incorporates or includes at least one protocol signal or signals. A protocol signal may carry information relating to the formatting or make up of an audio visual signal, including parameters associated with how such a signal was generated, as well as information relating to the configuration, status, or state of the physical hardware used to generate such a signal. Furthermore, a protocol signal may also provide indications with regard to when the content displayed changes or switches using feedback or information from the particular hardware used to generate an audio visual signal. In addition, a protocol signal may also provide information regarding how a transmitted audio visual signal was created such as, for example, whether a data compression scheme was used in the generation of the signal, and also may provide some basic information regarding how such a compression scheme operated.

Preferably, the present invention may be adapted to initially read at least one protocol signal received in conjunction with an audio visual signal making up the videoconference transmission. The particular information encoded into such a protocol signal or signals can then be used to make specific decisions or determinations regarding how the incoming audio visual signal should in turn be encoded or formatted for supply to further observers. The information harvested from a protocol signal can be used to select and subsequently apply a specific encoding process or algorithm to produce the encoded output required of the present invention. The exact form of the information obtained from the protocol signal and the encoding processes available and of interest to an operator of the present invention will determine which encoding process is selected and applied.

According to a further aspect of the present invention there is provided a method of encoding audio visual media signals characterised by the steps of:
    (i) receiving a videoconference transmission from the computer network, said videoconference transmission including at least one audio visual signal and at least one protocol signal, and
    (ii) reading one or more protocol signals, and
    (iii) determining the time position of a keyframe present within an audio visual signal received, and
    (iv) encoding a keyframe into the encoded output at the same time position at which the keyframe was detected and the original received audio visual signal.

In a preferred embodiment, information obtained from a protocol signal may include or indicate the time position or location of keyframes present within the audio visual signal or signals received.

Keyframes are generated and used in digital video compression processes, and provide the equivalent of a full traditional video frame of information. In addition to keyframes, pixel modification instructions can be transmitted as the second portion of the video information involved. A keyframe (which incorporates a significant amount of data) can be taken and then further information regarding the change in position of objects within the original keyframe can then be sent over time, thereby reducing the amount of data which needs to be transmitted as part of an audio visual signal.

This approach to video compression does however approximate the actual frames which composed the original video signal, as whole original frames (the keyframes) are only transmitted or incorporated occasionally. If a previously compressed video signal is subsequently re-encoded or 'transcoded', these keyframes may be lost or a new keyframe may be selected which was not originally a keyframe in the starting compressed video. This can degrade the quality or accuracy of the resulting re-encoded or re-formatted video signal.

However, if in conjunction with the present invention, the time position of each of the keyframes employed can be extracted or detected from protocol information. This allows the same keyframes to then be re-used in the re-encoding or re-formatting of the video content of the audio visual signal while minimising any subsequent loss of quality or introduction of further inaccuracies. In such instances, keyframes are encoded into the encoded output at the same time as keyframes are detected in an audio visual signal of the videoconference transmission involved.

According to another aspect of the present invention there is provided a method of encoding audio visual media signals characterised by the steps of:
    (i) receiving a videoconference transmission from a computer network, said videoconference transmission including at least one audio visual signal and at least one protocol signal, and
    (ii) reading one or more protocol signals to determine the encoding characteristics of the received videoconference transmission, and
    (iii) receiving encoding preferences from at least one user, and
    (iv) selecting from a set of encoding processes a subset of encoding processes which can be implemented using the user's encoding preferences and the encoding characteristics, and
    (v) displaying the subset of encoding processes to a user.

In a preferred embodiment, the present invention may also provide the user interface facility which allows a user or operator to set up how they would prefer incoming audio visual signals to be encoded or formatted. An operator may supply encoding preferences or input information with such a user interface, which can in turn be used to tailor the characteristics of the encoded output produced.

In a further preferred embodiment, information or parameters regarding the characteristics of an incoming audio visual signal may also be extracted from one or more protocol signals. These encoding characteristics of the received videoconference transmission may be used in conjunction with information supplied by a user to determine a potential encoding scheme or schemes to be selected in a particular instance.

In a preferred embodiment the received encoding characteristics and encoding preferences may be used to select from several potential encoding processes a subset of encoding processes which can actually be implemented to meet the user's preferences based on the encoding characteristics of the received videoconference transmission. Preferably this subset of possible or available processes may be displayed to a user for subsequent selection of one or more process for use.

In yet a further preferred embodiment, the present invention may include the facility to pre-calculate or pre-assess a number of encoding schemes which will potentially produce the best resulting encoded output based on both the user's encoding preferences and encoding characteristics obtained from a protocol signal or signals. In such instances, a subset of available or possible encoding processes may still be presented or displayed to a user but the system or software provided may make a recommendation as to the best potential process for a user to select.

This facility can operate like a user interface "wizard" so that the user will be presented with a facility to select and use only encoding schemes which are capable of satisfying the user requirements or parameters supplied based on the information extracted from a protocol signal or signals associated with an incoming videoconference transmission.

For example, in one preferred embodiment, a user may input a required bit rate for the resulting encoded output in addition to the software player format required for the resulting output. Further information may also be provided by a user with respect to the number of monitors they wish to simulate from the videoconference call.

Information regarding the make-up or characteristics of an incoming audio visual signal can then be obtained from one or more protocol signal or signals. For example, in one instance, this information obtained from a protocol signal may include any combination of the following;
    (i) audio codec employed
    (ii) video codec employed
    (iii) audio bit rate
    (iv) video bit rate
    (v) video frame rate
    (vi) video resolution.

This information available for the software associated with or used by the present invention can then make a selection or present a range of options to a user indicating which audio and/or video codec to use, as well as the particular video resolution and video frame rates available for use which will satisfy the input criteria originally supplied by the user.

In a preferred embodiment information may be obtained from at least one protocol signal which indicates a content switch present within the audio visual signal or signals received. Such a content switch may indicate that audio visual signals are generated by a new or different piece of hardware, or that the configuration of a currently used camera or microphone has been modified.

For example, in some instances a protocol signal may indicate that a video freeze picture request signal has been received as part of a videoconference transmission. This freeze signal will hold the current frame or picture making up the video content of the conference on the screens of all participants and hence will indicate that a content switch has taken place. In this way a change from dynamic to static content can be detected. The transmission of a freeze picture release control command or the removal of the freeze picture request signal within a protocol signal may also be detected as a content switch in conjunction with the present invention.

Furthermore, a content switch may also be detected through a protocol signal indicating whether a document camera is currently being used to provide a video feed into the conference. Such a document camera may show good quality close views of printed material as opposed to the participants of the conference. As such, the activation or use of a document camera and the integration of a document camera signal, or the removal of a document camera signal from a protocol signal can in turn indicate that the content of the video signals transmitted has switched or changed.

In yet another instance a protocol signal may carry status information indicating that a digital image or digital slide is to be used to currently form the video content of the conference. Such an image incorporation or still image indicator signal within a protocol signal may again be used to detect a content switch. A still image or 'snap shot' may be presented as the video content of the conference with this image sourced from a digital file, digital camera, video recorder, or any other compatible or appropriate type of data or information input system. Furthermore, such contents flagged or indicated as a snapshot or still image by protocol signals may also be sourced directly from a document camera with the videoconferencing equipment if required. In addition, the removal of such still image information may also be used to indicate a content switch.

Furthermore, content switches may also be detected through the automated panning or movement of a video camera lens from a number of pre-selected viewing positions or angles. These viewing positions may be pre-set to focus a camera on selected seating positions and their associated speakers, so that when the camera preset viewing angle changes, the content switch involved can be indicated by information present within a protocol signal. Therefore, the integration of a camera movement signal into a protocol signal can be used to detect a content switch.

In a further embodiment of the present invention a site name may be associated with each end point of a vide conference where audio visual signals transmitted from each site also have the site name embedded into a protocol signal or signals associated with these audio visual transmissions. A content switch may be detected through a change in name associated with an audio visual signal or signals where the name associated with each signal may furthermore be used to index, search through or classify the content involved depending on the site at which each portion of content is generated.

According to another aspect of the present invention there is provided a method encoding audio visual media signals characterised by the steps of:
 (i) receiving a videoconference transmission, from a computer network, said videoconference transmission including at least one audio visual signal and at least one protocol signal, and
 (ii) reading one or more protocol signals, and
 (iii) detecting a content switch within the audio visual content of a received audio visual signal, and
 (iv) encoding an index marker at the time position at which the content switch was detected.

According to a further aspect of the present invention there is provided a method of encoding audio visual media signals substantially as described above characterised by the steps of:
 (i) receiving a videoconference transmission, from a computer network, said videoconference transmission including at least one audio visual signal and at least one protocol signal, and
 (ii) reading one or more protocol signals, and
 (iii) detecting a content switch within the audio visual content of a received audio visual signal, and
 (iv) encoding a keyframe and
 (v) encoding an index marker at the same time position or adjacent to the position of the keyframe encoded.

According to yet another aspect of the present invention there is provided a method of encoding substantially as described above wherein index markers are encoded within a time threshold from the time position of keyframes.

In a preferred embodiment, the detection or indication of a content switch within an audio visual signal may trigger the association of at least one index marker with the encoded output provided, where this index marker is associated with substantially the same time position in the encoded output as the content switch was detected in the incoming audio visual signal or signals.

In a further preferred embodiment index markers may be associated with the same time position at which a content switch was detected in the original incoming audio visual signal or signals involved. Those skilled in the art should appreciate however that some degree of variation in the exact placement or positioning of the index marker involved will occur due to the physical limitations of the software and equipment employed in conjunction with the present invention. However, in alternative embodiments the index marker involved may be associated with encoded output within a set time threshold period. In such instances, a degree of latitude may be allowed with respect to when an index marker is to be encoded, with the threshold distance or period involved dictating the degree of latitude allowed.

Furthermore, an index marker encoded may also include reference information regarding how the particular content switch was detected and therefore may give an indication as to what the content of the audio visual signal is at the particular time position which the index marker is located at.

In a preferred embodiment an index marker may be associated with the encoded output provided through the actual encoding of a reference, pointer, URL or other similar marker actually within the encoded output provided. This marker or reference may then be detected by a player application at approximately the same position as the content switch of the video content in place. However, in other embodiments an index marker may not necessarily be directly encoded into the output to be provided. For example, in one embodiment a log file or separate record of index markers may be recorded in addition to time position or location information associated with the video signal involved. This file can indicate at which particular time positions an index marker is associated with the video content involved.

In a further preferred embodiment, an index marker may be implemented through the insertion of a universal resource locater (URL) into the encoded output produced by the present invention. Those skilled in the art should appreciate that URL's are commonly used in the art to index audio visual media, and as such the present invention may employ existing technology to implement the index markers discussed above.

Preferably, these index markers encoded into the output provided may be used by the user of a player application to proactively seek or search through the audio visual output of the present invention, depending on the particular content which these index markers reference. An index marker may mark the time position or location in the encoded output at which selected types of content are present and subsequently allow a user to easily search the entire output produced for a selected portion or type of content.

In a further preferred embodiment, the presence of original keyframes within an incoming audio visual signal or signal's in proximity to the time position at which an index marker is to be encoded can also be detected in conjunction with the present invention.

If too many keyframes are located in proximity to one another this will degrade the quality of resulting encoded output of the present invention, and also potentially affect frame rate and quality. However, it is preferable to have a keyframe close to an index marker in the encoded output as this will allow a software player application to seek to the time position of the index marker to quickly generate the video content required using a nearby keyframe.

Preferably, through detecting whether an original keyframe is near to the time position at which an index marker is to be encoded, the present invention may optimise the placement of keyframes in the resulting encoded output. If no keyframe is present within a specified threshold time displacement tolerance, a new keyframe may be encoded at approximately just before, after, or at the same time position as where the index marker is to be encoded. Conversely, if a keyframe is available within the threshold time period, no new keyframe may be generated or incorporated into the resulting encoded output. In this manner, a keyframe may be encoded into the encoded output at the same time position or adjacent to the time position of the index marker involved.

According to a further aspect of the present invention there is provided a method of encoding audio visual media signals characterised by the steps of:

(i) receiving a videoconference transmission from a computer network, said videoconference transmission including at least one audio visual signal and at least one protocol signal, and (ii) reading one or more protocol signals, and (iii) detecting the existence of a low content state present within a received audio visual signal, and (iv) time compressing the encoded output content during the time period in which said low content state is detected within the videoconference transmission received.

According to a further aspect of the present invention there is provided a method of encoding audio visual media substantially as described above wherein a buffer is used to receive videoconference transmission signals, whereby the rate at which the contents of the buffer is played out into an encoding process determines the degree of time compression applied to the original videoconference audio visual content when encoded.

In a preferred embodiment, the present invention may also be used to modify the timing or time position of particular portions of audio visual content present within the encoded output when compared to the original audio visual signal or signals provided. This timing modification may be completed if a particular content switch is detected through reading a protocol signal or signals.

In a further preferred embodiment, the encoded output may be time compressed when a low content state is detected within a received audio visual signal using at least one read protocol signal. Such low content states may persist for random periods of time and if encoded directly into the encoded output may make for a stilted or slow presentation of content. The detection of a low content state (through preferably data or flags in at least one protocol signal) can allow the audio visual content present within the encoded output to be speeded up if required.

In a further preferred embodiment the video and audio content received may be time compressed if a fast picture update or a freeze or hold picture control instruction is detected in a protocol signal. Normally these instructions or signals are associated with the transmission of large amounts of image information between participants in the videoconference, which can take some time to arrive and be assembled at a particular end point. This in turn can provide a relatively stilted presentation as the participant's interest in the current frozen image or picture may have been exhausted before all of this information has been received and subsequently displayed.

Through use of the present invention, this information system may be pre-cached and subsequently displayed for a short period of time only. The audio content of the conference may also be compressed over time to synchronise the audio and visual content portions, provided that limited audio content is also generated over the time at which the still image or frozen frame is displayed.

In a further preferred embodiment a buffer may be used to time compress the audio visual content of the encoded output. In such embodiments, a buffer or buffer like component or data structure can be used to initially receive audio visual signals so that the rate at which the contents of the buffer is played out into an encoding process will in turn determine the degree of time compression applied to the videoconference content when encoded. When time compression is to be over a selected period in which a low content state is detected, the contents of the buffer may be played out to an encoder processed at a faster rate than normally employed.

Furthermore, preferably when a Freeze Picture Release command or signal is received in a protocol signal the contents of the buffer can be played out slower than normal until the buffer has made up the amount of content that it played out faster previously.

The present invention may provide many potential advantages over the prior art. The present invention may read and subsequently employ information from a protocol signal or signals to make intelligent decisions regarding how an audio visual signal or stream should be encoded or re-formatted.

Information may be obtained from such protocol signals regarding the original keyframe placement within the incoming audio visual signal, with this information in turn being employed to re-use the same keyframes in output audio visual information provided. Furthermore, this technique may also be of assistance where particular content switches within the received audio visual signal are detected and indexed in the encoded output provided. These index markers supplied can allow a user to proactively seek or search through the resulting encoded output quickly for particular types of content. Furthermore, the keyframe placement information obtained from a protocol signal can also be used to ensure that a keyframe is placed in close time proximity to such index markers, thereby allowing the video information required to be generated and displayed quickly to a user.

Information obtained from a protocol signal or signals may also be used to assist in the selection of a particular encoding scheme or profile for an incoming audio visual signal or signals. Based on user preferences or selections and in conjunction with information relating to the characteristics of an incoming audio visual signal obtained from a protocol signal, a user may be presented with a limited number of coding schemes which will produce the best results for the input information that is supplied.

The present invention may also provide a facility to compress with respect to presentation time selected types of content present with an incoming audio visual signal or signals. If a relatively stilted or slow content portion is detected within an incoming videoconference (such as a freeze picture segment) the time over which the content is present may be compressed in the encoded output provided.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
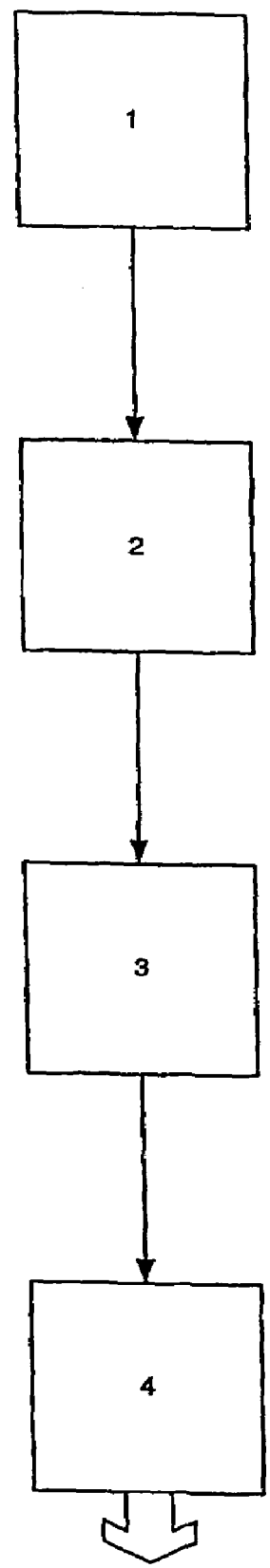
FIG. 1 shows a block schematic flowchart diagram of steps executed in a method of encoding audio visual media signals in conjunction with a preferred embodiment.

FIG. 1 shows a block schematic flowchart diagram of steps executed in a method of encoding audio visual media signals in conjunction with a preferred embodiment.

In the first step of this method an encoding computer system connected to a computer network receives a videoconference transmission from the computer network. This videoconference transmission includes audio visual signals and a set of protocol signals. The protocol signals provide information regarding how the audio visual signals were generated, in addition to the status of the particular hardware equipment used to generate signals.

In stage two of this method, information is extracted from the protocol signals received in stage 1. In the embodiment discussed with respect to FIGS. 1 and 2, the information extracted from these protocol signals consists of an indication of the time position at which keyframes are encoded into the original audio visual signals received and also information regarding when a particular content switch occurs within the audio visual information employed. In the embodiment considered a content switch is detected through the use of a document camera as opposed to a camera which shows the participants of the conference.

At stage three of this method a specific encoding process is selected for application to the received audio visual signals based on the information present within the protocol signals read. In the instance discussed, the encoding process selected incorporates specific index marker references into the output provided to indicate the content switch present within the audio visual information when a document camera is used. The encoding process selected also takes into account the position of each of the keyframes encoded into the original audio visual signal and adjusts its generation or application of keyframes within the encoded output produced based on the time positions of the original keyframes used.

In step four of this method the encoded output of the method is generated and produced for a particular software player application. In the instance discussed with respect to FIGS. 1 and 2, encoded output provided may be played on a Real Media Real Player.

Figure 2:
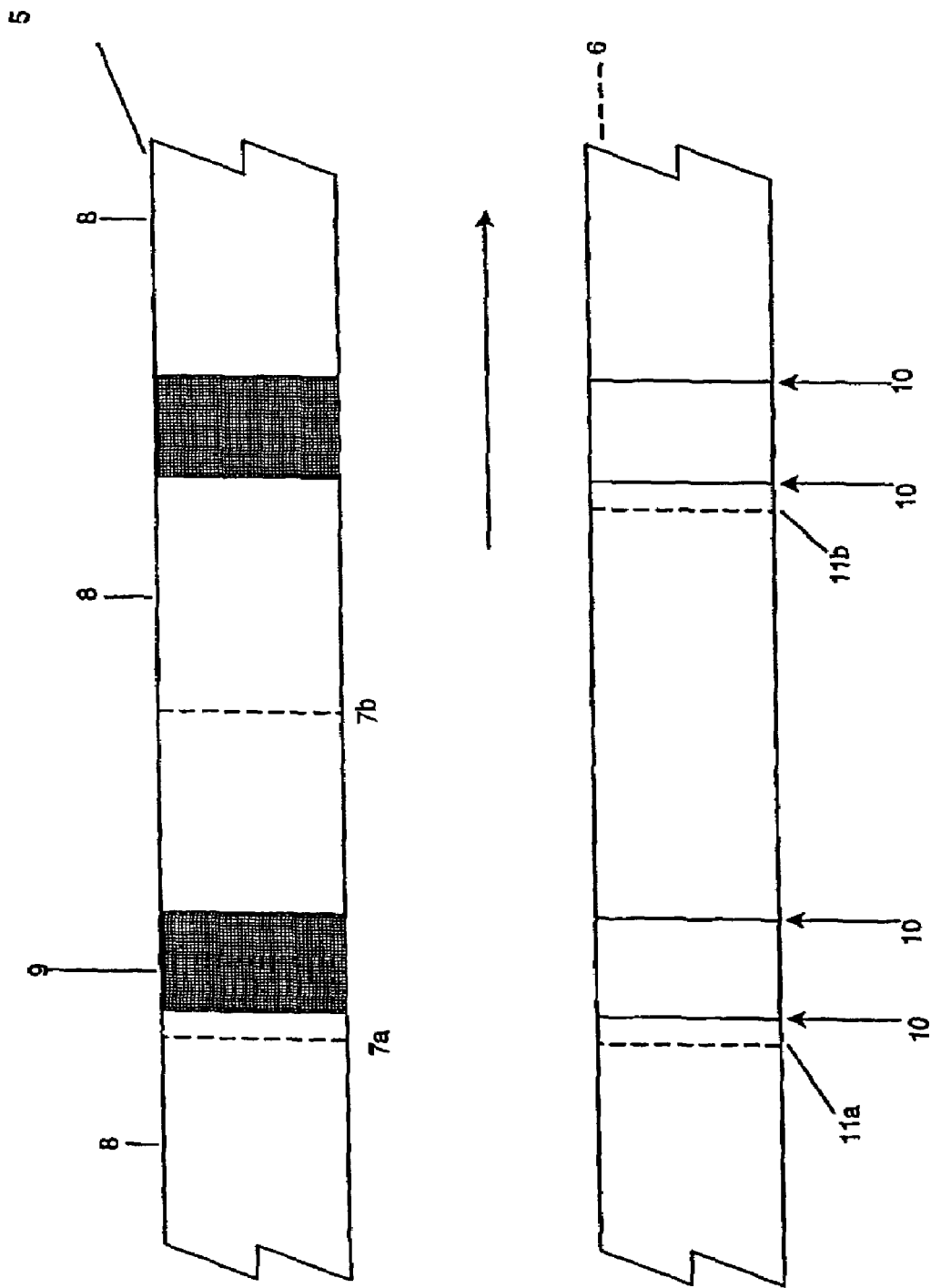
FIG. 2 illustrates in schematic form signals involved with the encoding process discussed with respect to FIG. 1, and FIGS. 3a, 3b, 3c show in schematic form signals with encoded keyframes as discussed with respect to FIG. 2.

FIG. 2 illustrates in schematic form elements of the encoding process discussed with respect to FIG. 1, showing an original audio visual signal (5) and subsequent encoded output audio visual signal (6).

The original signal (5) includes a number of keyframes (7) distributed at specific time positions along the playing time of the signal (5). The original signal (5) also incorporates specific content switches between a video showing content participants (8) and a still image or snap shot (9) taken from the video camera trained on the conference participants.

The re-encoded signal (6) takes advantage of information obtained from protocol signals received from an incoming videoconference transmission to detect the presence of the keyframes (7) and content switches taking place. Index markers (10) (formed in a preferred embodiment by URL's) are inserted into the encoded output signal (6) to indicate the presence of a content switch in the audio visual content of the signal.

Where possible, the original keyframes (7) of the incoming audio visual signal (5) are also recycled or reused as shown by the placement of the first keyframe (11a) in the second signal (6). However, in the instance shown, a new keyframe (11b) is generated and encoded into the second signal (6) to provide a keyframe in close proximity to an index marker indicating the presence of a content switch in the audio visual information to be displayed. In this instance the second keyframe (7b) of the original signal is not re-encoded or reused within the second signal (6).

Figure 3A:
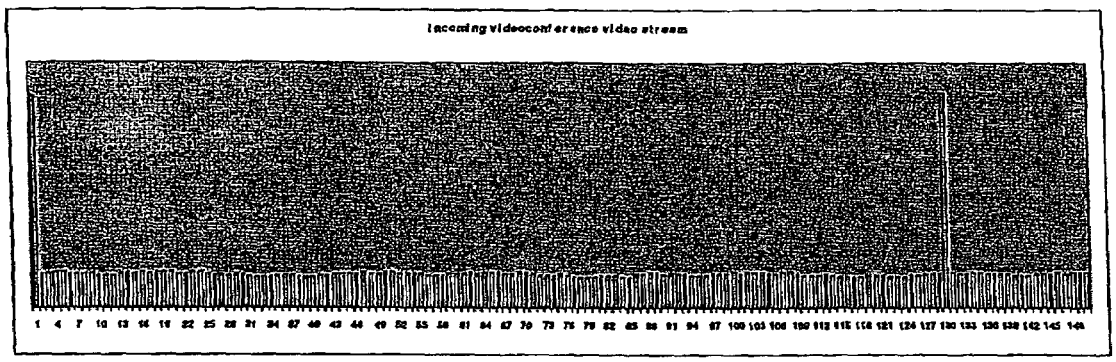
Figure 3B:
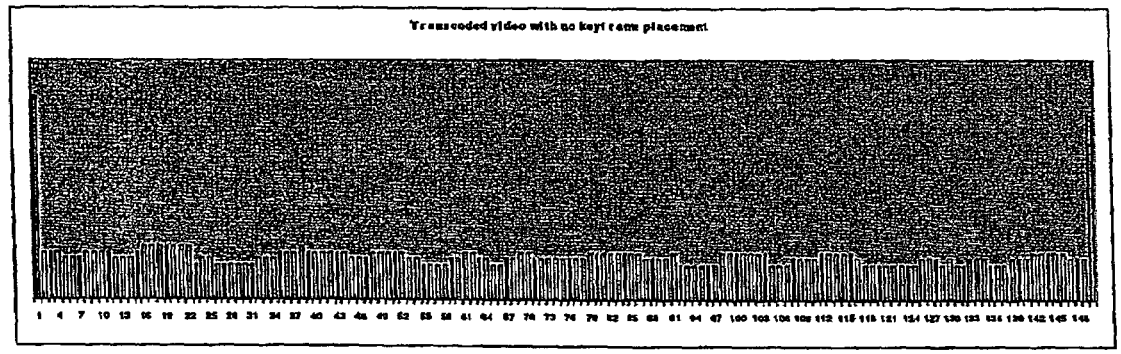
Figure 3C:
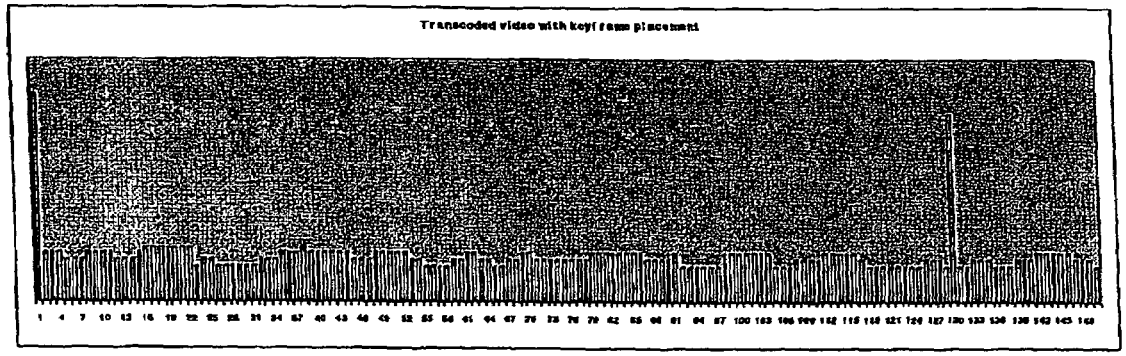

FIGS. 3a through 3c show an incoming video stream (3a), a video stream which is re-encoded without use of the present invention (3b) and a video stream re-encoded using the present invention (3c) where information regarding the original keyframe placements of the original video stream (3a) is employed.

As can be seen from FIG. 3b, a transcoded or re-encoded video signal does not necessarily have keyframes placed at the same positions or locations as those provided in the signal shown with respect to FIG. 3a without use of the present invention. Conversely, in FIG. 3c keyframes employed are positioned at essentially the same time position as the original keyframes within the original streamed video signal.

Figure 4:
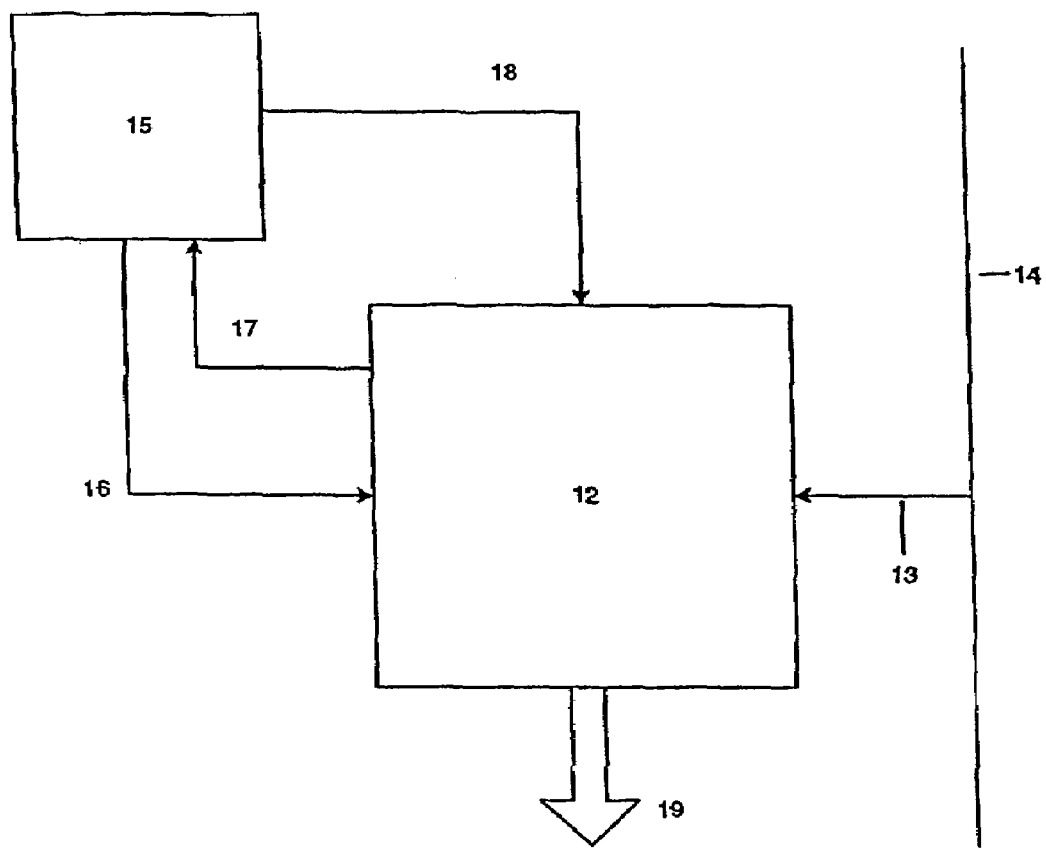
FIG. 4 shows a user interface and encoding scheme selection facility provided in accordance with another embodiment of the present invention.

FIG. 4 shows a user interface and encoding scheme selection facility provided in accordance with another embodiment of the present invention.

In the instance shown an encoding computer system (12) is provided with a connection (13) to a computer network (14). This computer network (14) can carry videoconference transmissions to be supplied to the encoding computer (12) which acts as an encoding end point for the videoconference. The encoding computer (12) transmits mute audio and blank video signals to be maintained as a participant to the conference, and is adapted to provide further encoded audio visual output sourced from the audio visual signals employed within the videoconference transmission.

A user interface module (15) may be provided in communication with the encoding computer (12) for a separate user computer, or through software running on the same encoding computer (12). This user interface (UI) module can initially send user parameter information 16 to the encoding computer system. The encoding computer system (12) can also extract audio visual signal parameter information from protocol signals received as part of the videoconference transmissions, where these parameters give information regarding the audio visual signals making up part of the video transmission. These parameters can provide information relating to the make up of an incoming audio visual signal such as;
 (i) the audio codec employed, and
 (ii) the video codec employed, and
 (iii) the bit rate of audio information supplied, and
 (iv) the bit rate of video information supplied, and
 (v) the video information frame rate, and
 (vi) the video information resolution.

The encoding computer system may, using all of the user and protocol information obtained, calculate a number of "best fit" encoding schemes which can be used to meet the requirements of a user for an incoming video stream. Information regarding valid encoding schemes may then be transmitted (17) to the UI module, which in turn allows a user to transmit the scheme selection instruction (18) back to the encoding computer (12) to indicate which encoding scheme should be employed.

Based on these instructions, the encoding computer system may encode and produce output (19) which can be played on a suitable computer based media player application.

The process used to select or specify a set of encoding schemes which may be used is also shown in more detail through the pseudo code set out below.

```
H.323 call parameters:
    H.263 video @ 112kbps
    H.263 video resolution @ CIF
    H.263 video frame rate @ 12.5fps
    G.728 audio @ 16kbps
User input:
    Bitrate:         56kbps Modem
    Player format:   RealMedia Native - Single Stream
    Display mode:    Single Monitor
Profiler decisions:
    // find the media type for the stream
    // either standard (video and audio only) or presentation (audio, video
and // snapshots)
    If Display_Mode = Single_Monitor then
            Profiler_Media_Type = (standard)
    Else
            Profiler_Media_Type = (presentation)
    EndIf
    // find the maximum audio bitrate for the stream based on the media
type
    // where media type is standard, allow more bitrate to the audio codec
than if
    // media type of presentation selected (when presentation
    need to leave
    // bandwidth for the snapshot).
```

```
    User_Bitrate = (56kbps) and Profiler_Media_Type = (standard)
    therefore
    Max_Audio_Bitrate = (8.5kbps).
    // select the audio codec for use in the stream based on the maximum
    // available bandwidth.
    If Incoming_Audio_Bitrate > Max_Audio_Bitrate then
        Profiler_Audio_Codec = Select Audio_Codec from
        Table_3 where
        Bitrate_Supported <= Max_Audio_Bitrate therefore
        Profiler_Audio_Codec = (RealAudio_8.5kbps_Voice)
    Else
        Profiler_Audio_Codec = Incoming_Audio_Codec
    EndIf
    // set the video bandwidth based on total available bandwidth and
    bandwidth
    // used by audio codec.
    Profiler_Optimum_Bitrate = Select Optimum_Bitrate from
    Table_4 where
    Bandwidth_Option = (56kbps_Modem)
    If (Profiler_Audio_Codec <> Incoming_Audio_Codec) then
        Profiler_Audio_Bitrate = Select Bitrate_Supported
    from Table_3 where
        Audio_Codec = (Profiler_Audio_Codec)
    Else
        Profiler_Audio_Bitrate = Incoming_Audio_Bitrate
    EndIf
    Profiler_Video_Bitrate = Profiler_Optimum_Bitrate -
    Profiler_Audio_Bitrate
    therefore
    Profiler_Video_Bitrate = (29.5kbps)
    // set video resolution
    Profiler_Video_Res = Select Optimum_Resolution
    from Table_4 where
    Bandwidth_Option = (56kbps_Modem) therefore
    Profiler_Video_Res = (176x144)
    // set video codec
    If User_Player_Format = RealMedia_Native then Profiler_Video_
    Codec = (RealVideo9).
    // set video frame rate
    Max_Profiler_Frame_Rate = Incoming_Frame_Rate
    Profiler_Frame_Rate = Select Optimum_Frame_Rate from
    Table_4 where Bandwidth_Option = (56kbpsModem)
    If Profiler_Frame_Rate > Max_Profiler_Frame_Rate then
            Profiler_Frame_Rate = Max_Profiler_Frame_Rate
    EndIf
```

Figure 5A:
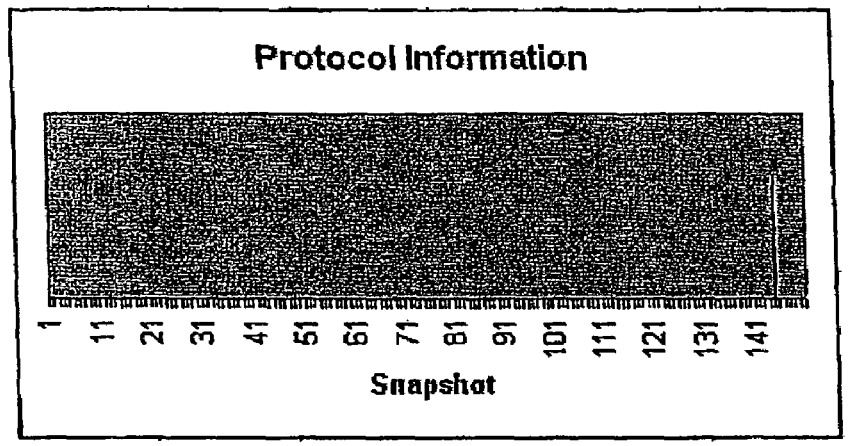
FIGS. 5a, 5b, 5c show a series of schematic diagrams of signals both used and produced in accordance with a further embodiment of the present invention, and FIGS. 6a, 6b & 6c again show schematically a set of signals received and subsequently produced in accordance with yet another embodiment of the present invention, and FIG. 7 & Table 1 show a process flowchart and related pseudo code detailing steps taken in the insertion or encoding of a keyframe in conjunction with a preferred embodiment of the present invention, and FIGS. 8 & 9, Tables 2 & 3 illustrate the encoding of keyframes and index markers in accordance with a further embodiment of the present invention, and FIG. 10 & Table 4 illustrate the provision of an adaptive content playout mechanism employing a buffer to accelerate the encoding of content when low content states are detected.
Figure 5B:
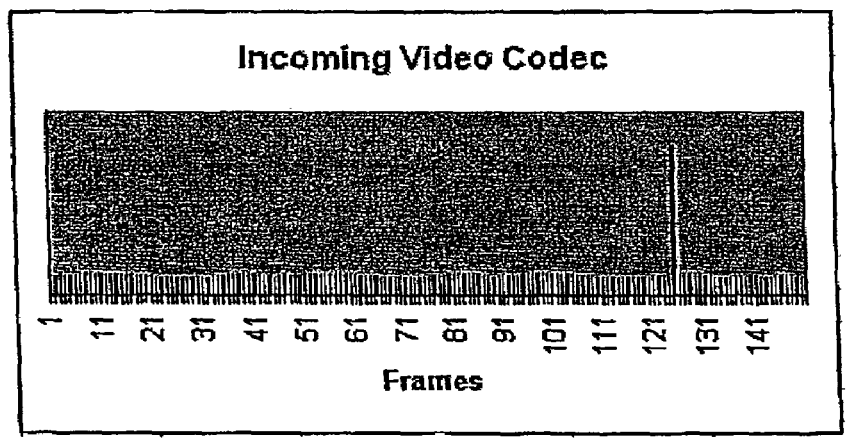
Figure 5C:
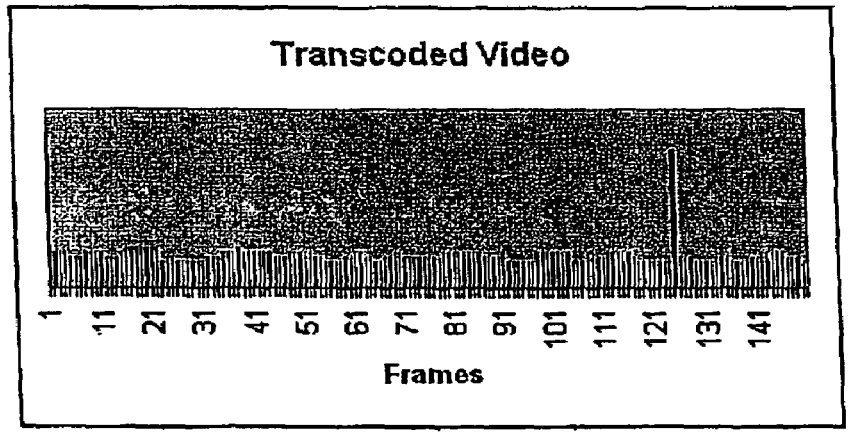

FIGS. 5a through 5c show a series of schematic diagrams of signals associated with the present invention, and illustrate further behaviour of the invention depending on the input signals it receives.

FIG. 5a shows an incoming protocol signal which indicates that a snap shot event occurs at frame 150 of the video signal shown with respect to FIG. 5b. FIG. 5b also shows that a keyframe has been encoded into the original incoming video at frame 125.

FIG. 5c shows the encoded video output provided in conjunction with the present invention in the embodiment shown. This figure illustrates how the invention can be used to place a keyframe in its encoded output signal depending on the input the videoconference transmissions received.

The software employed by the present invention makes a set of decisions in the instance shown. The first of these decisions is completed through considering a set value for the maximum time displacement between keyframes which should be in the encoded output signal. In the instance shown a keyframe is to be encoded every one hundred and fifty frames, and as a keyframe is provided at frame 124, this original keyframe is subsequently used in the encoded output (5c).

Secondly, the software employed notes that an index marker is to be encoded or written to the output provided at frame 150 to mark the placement of the snap shot event in the incoming video signal. By considering a tolerance value for time displacement from this index marker, the software employed can see that the keyframe present at frame 124 is within this tolerance and an additional keyframe does not necessarily need to be encoded just before the snap shot event at frame 150.

Figure 6A:
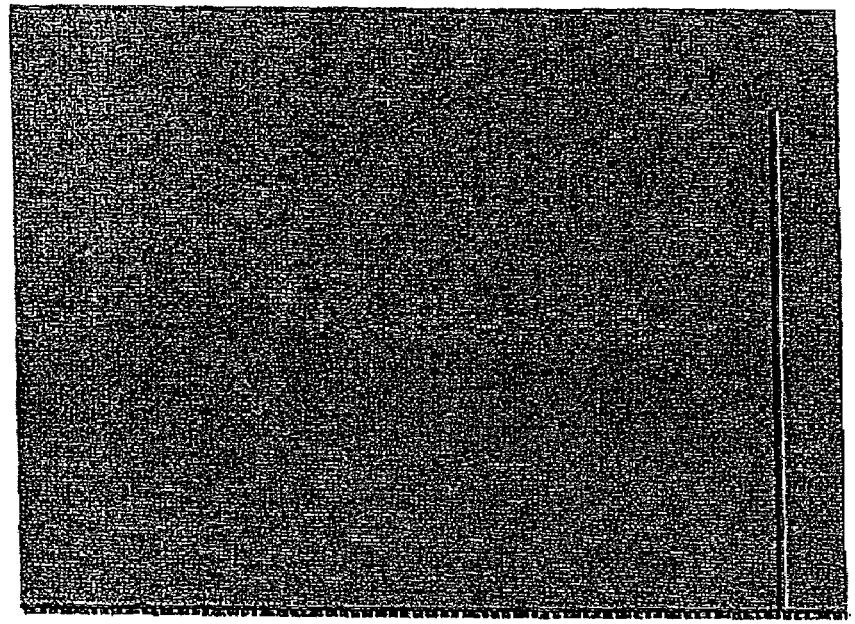
Figure 6B:
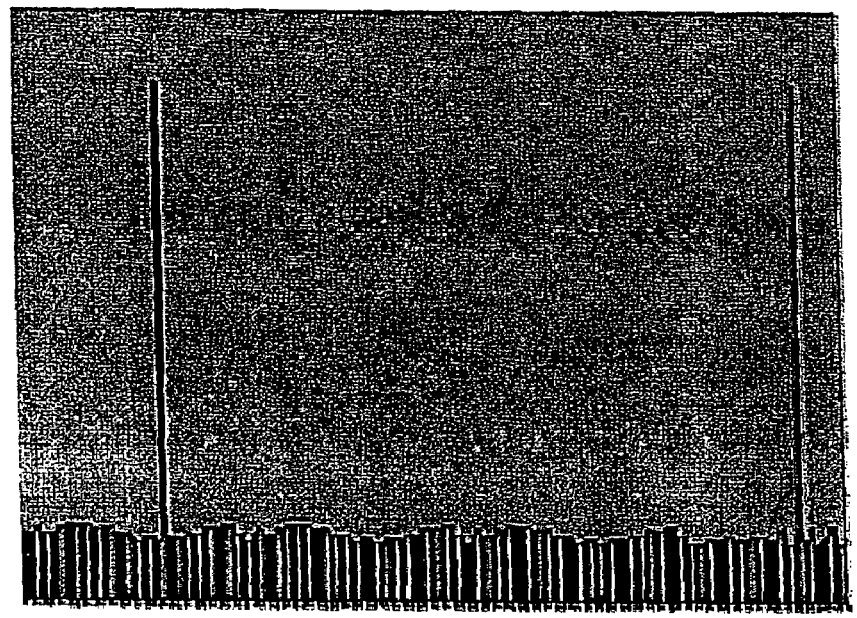
Figure 6C:
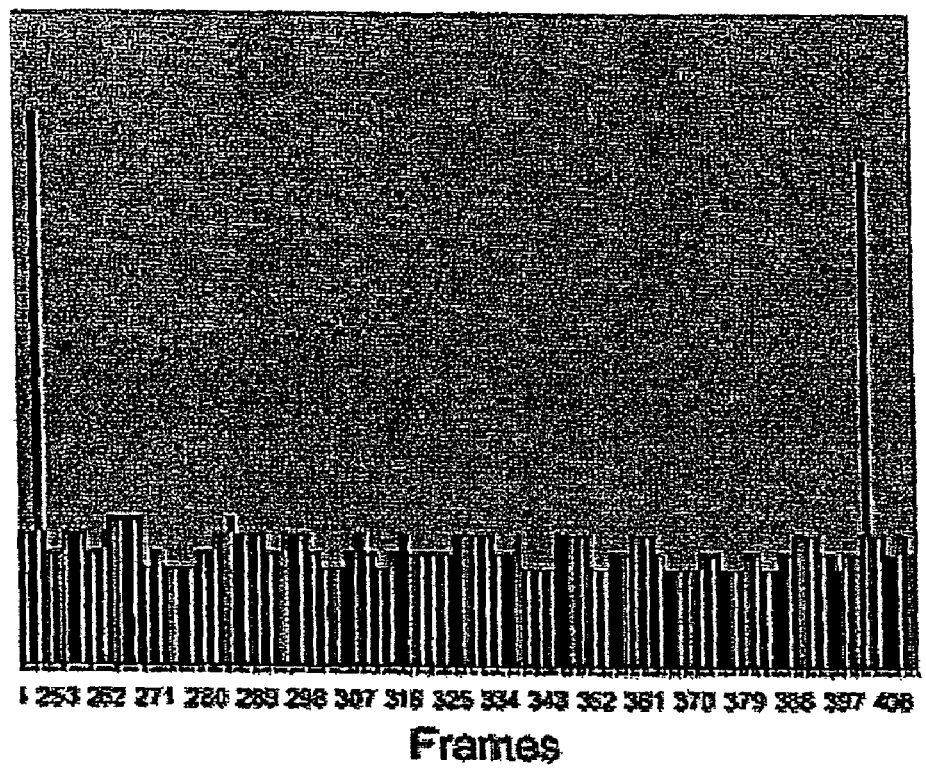

FIGS. 6a, 6b and 6c show a set of signals illustrating further behaviour of the present invention in yet another embodiment. In the embodiment shown an incoming protocol signal is shown with respect to FIG. 6a, an incoming video signal is shown with respect to FIG. 6b, whereas the encoded output video provided in conjunction with the present invention is shown as FIG. 6c.

In this snapshot the incoming video includes a keyframe at frames 275 and 402 with a video fast update picture protocol signal at frame 398. Conversely, the encoded output provided includes keyframes at frame 250 and 402 respectively. In this instance shown a decision is made to encode the output to be provided so that keyframes are located a maximum of 150 frames apart. However, this maximum time between keyframes may be varied depending on the particulars of the incoming signal, as discussed below.

When the original keyframe located at frame 275 in the incoming signal is detected, a decision is made by the software employed not to encode a keyframe in the output due to the proximity to the previous encoded keyframe provided at frame 250. One hundred and fifty frames from frame 250, a keyframe should be encoded based on the maximum time between keyframes value. However in this case it is not encoded as the protocol signal at frame 398 shows that a keyframe is expected in the following frames. In this case the maximum time between keyframes is extended slightly to allow for the keyframe associated with the video fast picture update to be delivered. This keyframe arrives in the incoming video at frame 402 and the keyframe is then encoded in the output video at frame 402.

Figure 7:
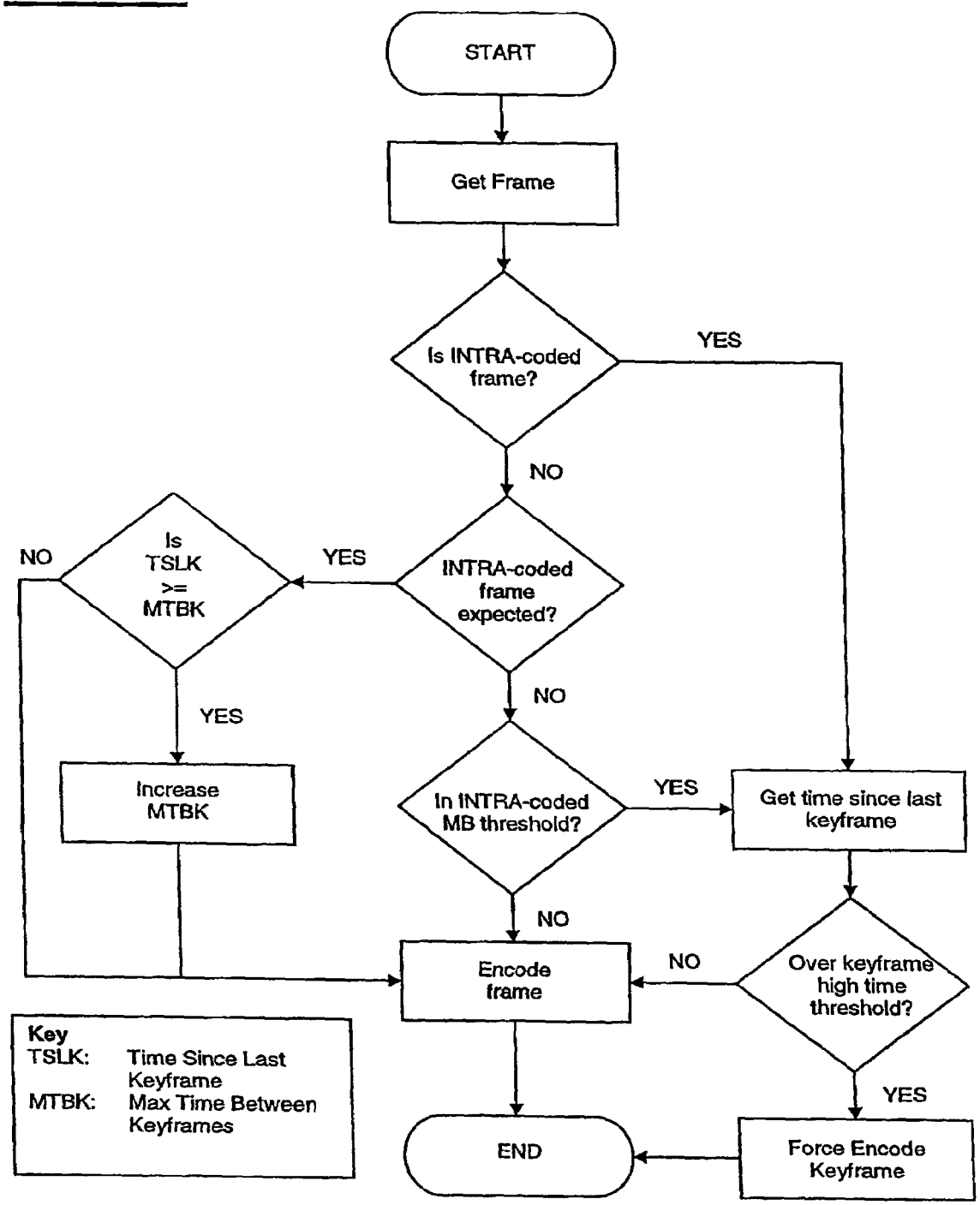

FIG. 7 & Table 1 show a process flowchart and related pseudo code detailing steps taken in the insertion or encoding of a keyframe in conjunction with a preferred embodiment of the present invention.

The process described initially receives a frame from decoding elements or components of video conferencing equipment which forms an end point to a video conferencing call.

The frame received is initially investigated to determine whether it is intra-coded, or forms a keyframe in the audio visual signals received in conjunction with the videoconference involved. This keyframe test is implemented through checking the number of actual INTRA-coded macroblocks within the frame where a maximum possible INTRA-coded macroblock count will indicate the presence of a keyframe.

If the frame is not confirmed as a keyframe, the process then checks to determine whether the video conferencing systems involved have transmitted a fast picture update to the source of videoconference transmission, where such a fast picture update requests the transmission of a keyframe.

If a keyframe is not expected, the received frame is tested to determine its quality or the proportion or percentage of macroblock elements it contains when compared to a maximum macroblock level. In the embodiment discussed this threshold test is set at 85%. If the frame passes this 85% threshold value, it is effectively treated as a keyframe and the part of the process dealing with the treatment of keyframes is run.

If the received frame fails the macroblock or intra-coded threshold test, it is forwarded to a standard encoding system which produces the bulk of the encoded output required. This encoding system will encode the frame required either in inter coded form or an intra coded form depending on its internal parameters.

If the received frame is not confirmed as a keyframe yet a keyframe is expected, a test is completed to determine whether the time since the last keyframe is greater than or equal to the maximum time allowable between keyframes. If this test results in a true value, then the maximum time between keyframes allowed is increased and the frame is subsequently sent to the standard encoding system. Conversely if the time between keyframes is lower than the maximum time involved, the frame is simply sent to the standard encoding system.

The maximum time between keyframes value is then employed to test whether it should encode the current frame it receives as a keyframe or as an interceded frame.

If the system confirms that a keyframe is received or tests the quality of received frame and determines that it is of a high enough quality to be treated as a keyframe, the time since the last keyframe was received is retrieved. Next a test is completed to determine whether the current keyframe was received after a maximum time threshold value. If this maximum time threshold has been exceeded, then the system or process provided will force the encoding of the current frame as a keyframe in the encoded output. If this time threshold has not been exceeded, then the current frame is supplied to the standard encoding system.

Figure 8:
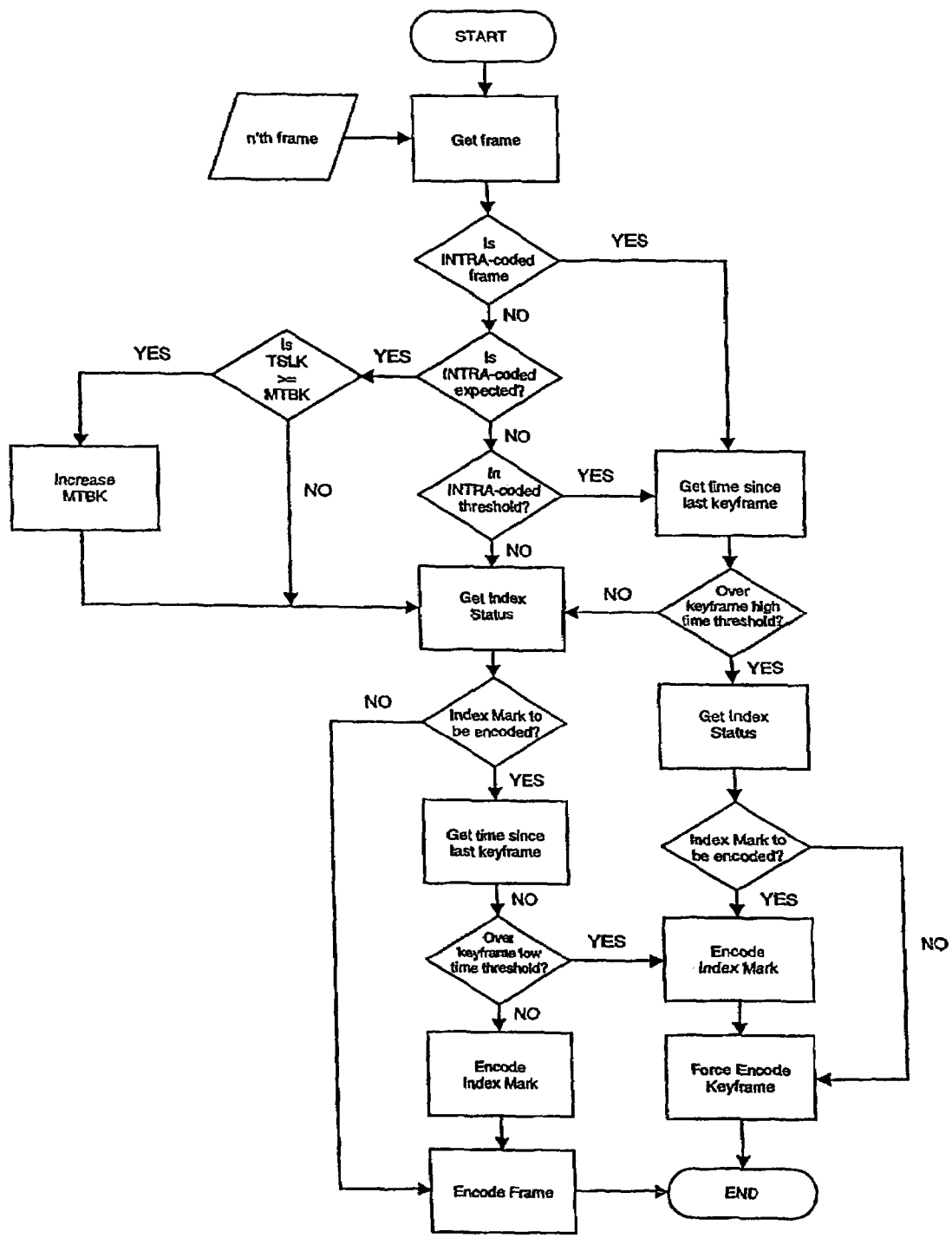
Figure 9:
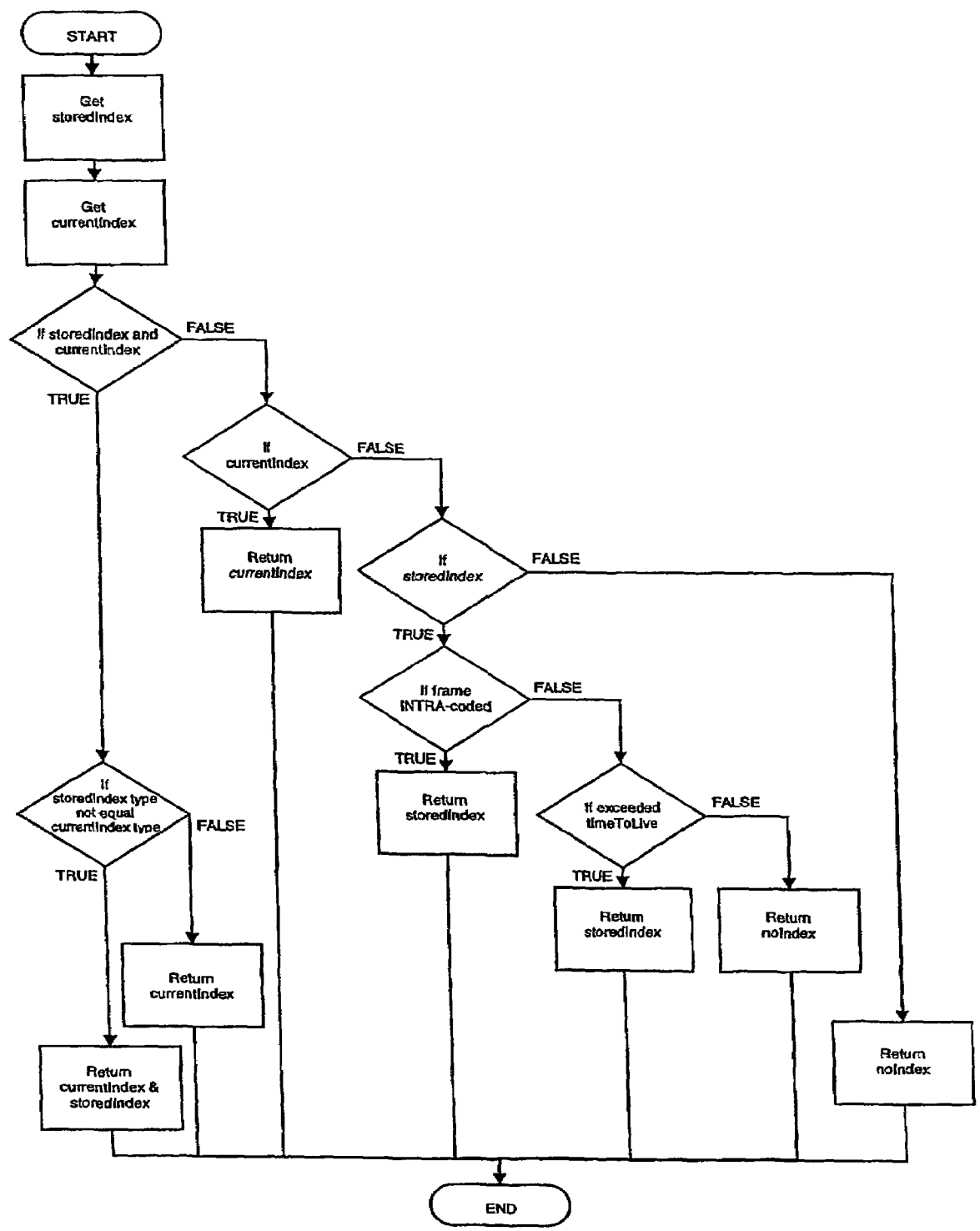

FIGS. 8, 9 and Tables 2 and 3 illustrate the encoding of keyframes and index markers in accordance with a further embodiment of the present invention.

In the initial stage of the process shown with respect to FIG. 8, the same steps are taken as discussed with respect to FIG. 7 for the encoding of keyframes. However, this process deviates at the point normally where keyframe or frames should be encoded.

In the process described, the encoding of a keyframe into the encoded output is delayed until the keyframe required is received from the videoconference. This process also tests a low time threshold value to determine whether the index marker received will be encoded within a specific time period or time displacement from a keyframe. If there is no existing keyframe available within the time period required, then the existing frame will be force encoded as a keyframe. Conversely, if a keyframe is available, the standard encoding process can be employed.

The additional index status procedure discussed with respect to FIG. 9 and table 3 allows for monitoring or tracking of two concurrent or consecutive index marker events, and also for encoding any index markers required. This allows one of these index markers to be discarded if it is clear that the operators or participants in the videoconference involved erroneously triggered the index marking event, and subsequently or immediately return the videoconference equipment to its prior state or existing configuration.

Figure 10:
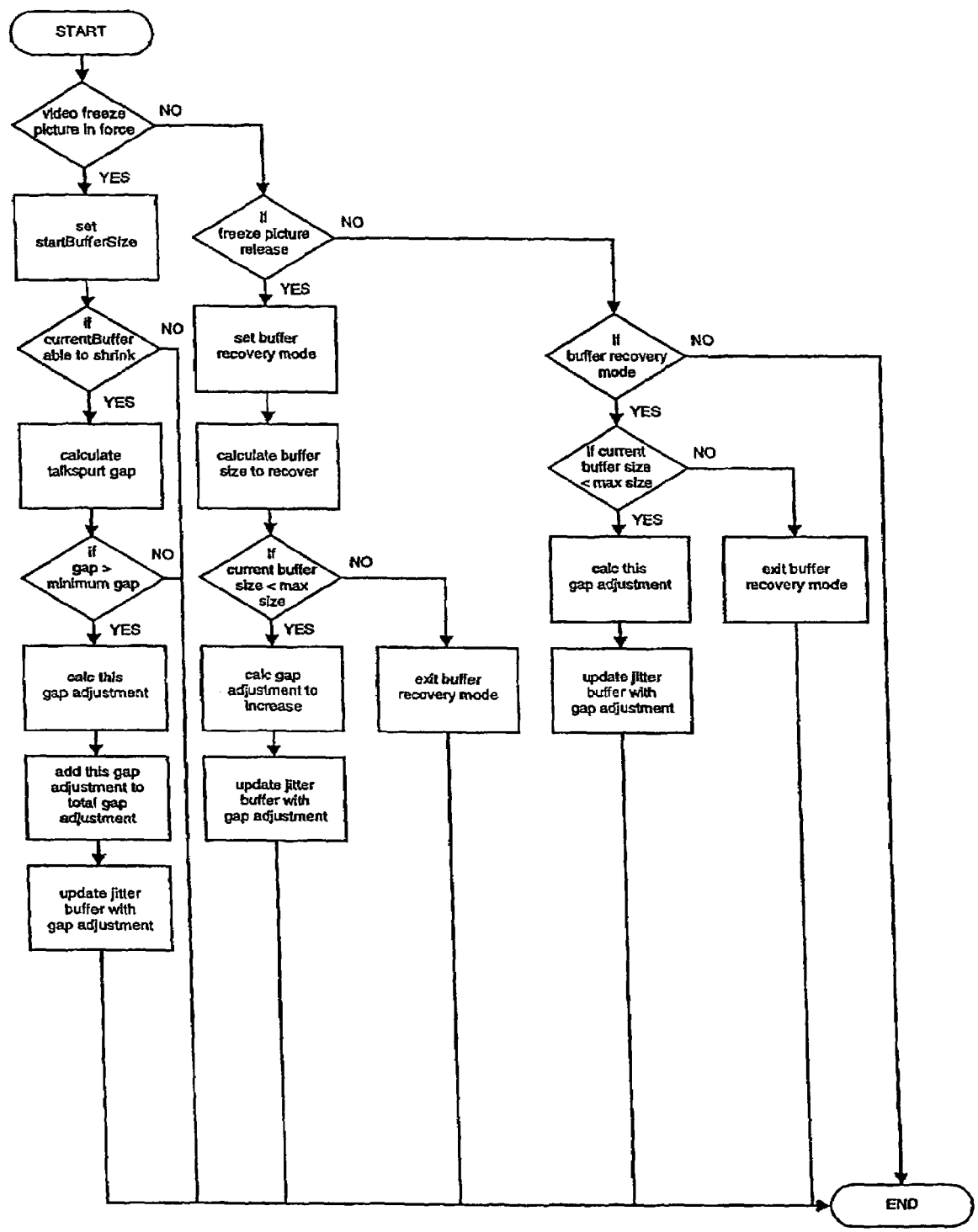

FIG. 10 & Table 4 illustrate the provision of an adaptive content playout mechanism employing a buffer to accelerate the encoding of content when low content states are detected.

In the implementation discussed, a freeze picture signal and protocol signal is used to determine a low content state exists. The buffer data structure is maintained and modified by the processes shown to speed up the time based rate of encoding or to slow same dependent on whether the video freeze picture signal involved has been maintained or has been released.

Aspects of the present invention have been described by way of example only and it should be appreciated that modifications and additions may be made thereto without departing from the scope thereof as defined in the appended claims.

What we claim is:

1. A method of encoding audio visual media signals that are part of a videoconference with a recording apparatus, comprising:
    configuring the recording apparatus as a participant in the videoconference,
    receiving, at the recording apparatus, a videoconference transmission from a computer network, said videoconference transmission including at least one audio visual signal and at least one protocol signal,
    reading, at the recording apparatus, one or more protocol signals from the computer network pertaining to the videoconference transmission,
    applying, at the recording apparatus, a selected encoding process to a received audio visual signal to generate an encoded videoconference, said encoding process being selected depending on the contents of said at least one protocol signal read,
    storing the generated encoded videoconference in a memory device associated with the recording apparatus, and
    outputting, at the recording apparatus, the encoded videoconference stored in the memory device to a reproduction device through the computer network.

2. The method of encoding as claimed in claim 1, further comprising:
    transmitting, by the recording apparatus, a mute audio signal and a blank video signal so the recording apparatus is maintained as a participant to the videoconference.

3. The method of encoding as claimed in claim 2, wherein the reproduction device did not directly participate in the videoconference.

4. The method of encoding as claimed in claim 2, further comprising:
    time compressing output audio visual content of the encoded output when a low content state is detected from a received protocol signal.

5. The method of encoding as claimed in claim 4, wherein the time compressing includes using a buffer to time compress the audio visual content of the encoded output.

6. The method of encoding as claimed in claim 1, wherein the one or more protocol signals includes information regarding any combination of one or more of following parameters associated with an audio visual signal of a videoconference transmission:
    (i) audio codec employed,
    (ii) video codec employed,
    (iii) the bit rate of audio information supplied,
    (iv) the bit rate of video information supplied,
    (v) the video information frame rate, or
    (vi) the video information resolution.

7. The method of encoding as claimed in claim 1, wherein a content of the one or more protocol signals is used to detect a time position of at least one keyframe present within an audio visual signal of the videoconference transmission.

8. The method of encoding as claimed in claim 1, wherein the contents of said at least one read protocol signal indicates a content switch present within an audio visual signal of the videoconference transmission.

9. The method of encoding as claimed in claim 8, further comprising:
    detecting a content switch from a freeze picture signal extracted from a protocol signal.

10. The method of encoding as claimed in claim 8, further comprising:
    detecting a content switch from a removal of a freeze picture request signal extracted from a protocol signal.

11. The method of encoding as claimed in claim 8, further comprising:
    detecting a content switch from a document camera signal extracted from a protocol signal.

12. The method of encoding as claimed in claim 8, further comprising:
    detecting a content switch from removal of a document camera signal extracted from a protocol signal.

13. The method of encoding as claimed in claim 8, further comprising:
    detecting a content switch from an image incorporation signal extracted from a protocol signal.

14. The method of encoding as claimed in claim 8, further comprising:
    detecting a content switch from removal of an image incorporation signal extracted from a protocol signal.

15. The method of encoding as claimed in claim 8, further comprising:
    detecting a content switch from a camera movement signal extracted from a protocol signal.

16. The method of encoding as claimed in claim 8, further comprising:
    detecting the content switch and triggering an association of at least one index marker with the encoded output at a corresponding time position in the encoded output at which the content switch was detected.

17. The method of encoding as claimed in claim 16, wherein the at least one index marker includes reference information indicating what content switch was detected.

18. The method of encoding as claimed in claim 16, wherein a protocol signal indicates a time position of at least one keyframe present within an audio visual signal of the videoconference transmission, and the method further comprising:
    including keyframes in the encoded output that are positioned adjacent to or in a same position as index markers encoded into said encoded output.

19. The method of encoding as claimed in claim 18, wherein keyframes included in the encoded output are positioned within a threshold time from an index marker.

20. The method of encoding as claimed in claim 18, wherein the keyframes are included in the encoded output at the same time position as index markers.

21. A storage medium containing therein a program which, when executed by a computer, causes the computer to perform the method of claim 1.

22. A method of encoding audio visual media signals with an encoding apparatus, the method comprising:
    receiving, at the encoding apparatus, a videoconference transmission from a computer network, said videoconference transmission including at least one audio visual signal and at least one protocol signal, and
    reading, at the encoding apparatus, one or more protocol signals,
    applying, at the encoding apparatus, a selected encoding process to a received audio visual signal, said encoding process being selected depending on contents of said at least one protocol signal read,
    wherein the content of a read protocol signal is used to detect the time position of at least one keyframe present within an audio visual signal of the videoconference transmission; and
    encoding keyframes into an encoded output at a same time position as keyframes are detected in an audio visual signal of the videoconference transmission.

23. A method of encoding audio visual media signals with an encoding apparatus, the method comprising:
- receiving, at the encoding apparatus, a videoconference transmission from a computer network, said videoconference transmission including at least one audio visual signal and at least one protocol signal,
- reading, at the encoding apparatus, one or more protocol signals,
- determining, at the encoding apparatus, a time position of a first keyframe present within an audio visual signal received, and
- encoding, at the encoding apparatus, a second keyframe into an encoded output at a same time position at which the first keyframe was detected in an originally received audio visual signal.

24. A storage medium containing therein a program which, when executed by a computer, causes the computer to perform the method of claim 23.

25. A method of encoding audio visual media signals with an encoding apparatus, the method comprising:
- receiving, at the encoding apparatus, a videoconference transmission from a computer network, said videoconference transmission including at least one audio visual signal and at least one protocol signal,
- reading, at the encoding apparatus, one or more protocol signals,
- detecting, at the encoding apparatus, a content switch within the audio visual content of a received audio visual signal or signals, and
- encoding, at the encoding apparatus, an index marker at a time position at which the content switch was detected.

26. The method of encoding as claimed in claim 25, wherein index markers are encoded within a time threshold from a time position of a keyframe.

27. A storage medium containing therein a program which, when executed by a computer, causes the computer to perform the method of claim 25.

28. A method of encoding audio visual media signals with an encoding apparatus, the method comprising:
- receiving, at the encoding apparatus, a videoconference transmission, from a computer network, said videoconference transmission including at least one audio visual signal and at least one protocol signal,
- reading, at the encoding apparatus, one or more protocol signals,
- detecting, at the encoding apparatus, a content switch within the audio visual content of a received audio visual signal,
- encoding, at the encoding apparatus, a keyframe, and
- encoding, at the encoding apparatus, an index marker at a same time position or adjacent to the time position of the keyframe encoded.

29. A storage medium containing therein a program which, when executed by a computer, causes the computer to perform the method of claim 28.

30. A method of encoding audio visual media signals with an encoding apparatus, the method comprising:
- receiving, at the encoding apparatus, a videoconference transmission from a computer network, said videoconference transmission including at least one audio visual signal and at least one protocol signal,
- reading, at the encoding apparatus, one or more protocol signals,
- detecting, at the encoding apparatus, an existence of a low content state present within a received audio visual signal or signals, and
- time compressing, at the encoding apparatus, the encoded output content during a time period in which said low content state is detected within the videoconference transmission received.

31. The method of encoding as claimed in claim 30, further comprising:
- using a buffer to receive videoconference transmission signals, wherein a rate at which contents of the buffer is read out to an encoding process determines a degree of time compression applied in the time compressing.

32. A storage medium containing therein a program which, when executed by a computer, causes the computer to perform the method of claim 30.

33. An apparatus for encoding audio visual media signals, said apparatus comprising:
- a receiving unit configured to receive a videoconference transmission from a computer network, said videoconference transmission including at least one audio visual signal and at least one protocol signal;
- a processor configured to,
  - read one or more protocol signals from the computer network pertaining to the videoconference transmission, and
  - apply a selected encoding process to a received audio visual signal to generate an encoded videoconference, said encoding process being selected depending on the contents of said at least one protocol signal read;
- a memory device configured to store the generated encoded videoconference; and
- an output unit configured to output the encoded videoconference stored in the memory device to a reproduction device through the computer network.

34. An apparatus for encoding audio visual media signals, said apparatus comprising:
- a receiving unit configured to receive a videoconference transmission from a computer network, said videoconference transmission including at least one audio visual signal and at least one protocol signal; and
- a processor configured to,
  - read one or more protocol signals,
  - determine a time position of a first keyframe present within an audio visual signal received, and
  - encode a second keyframe into an encoded output at a same time position at which the first keyframe was detected in an originally received audio visual signal.

35. An apparatus for encoding audio visual media signals, said apparatus comprising:
- a receiving unit configured to receive a videoconference transmission from a computer network, said videoconference transmission including at least one audio visual signal and at least one protocol signal; and
- a processor configured to,
  - read one or more protocol signals,
  - detect a content switch within the audio visual content of a received audio visual signal or signals, and
  - encode an index marker at a time position at which the content switch was detected.

36. An apparatus for encoding audio visual media signals, said apparatus comprising:
- a receiving unit configured to receive a videoconference transmission, from a computer network, said videoconference transmission including at least one audio visual signal and at least one protocol signal; and
- a processor configured to,
  - read one or more protocol signals, and
  - detect a content switch within the audio visual content of a received audio visual signal, encode a keyframe, and
encode an index marker at a same time position or adjacent to the time position of the keyframe encoded.

37. An apparatus for encoding audio visual media signals, said apparatus comprising:

a receiving unit configured to receive a videoconference transmission from a computer network, said videoconference transmission including at least one audio visual signal and at least one protocol signal; and a processor configured to,
read one or more protocol signals,
detect an existence of a low content state present within a received audio visual signal or signals, and
time compress the encoded output content during a time period in which said low content state is detected within the videoconference transmission received.

* * * * *